Patented Feb. 8, 1949

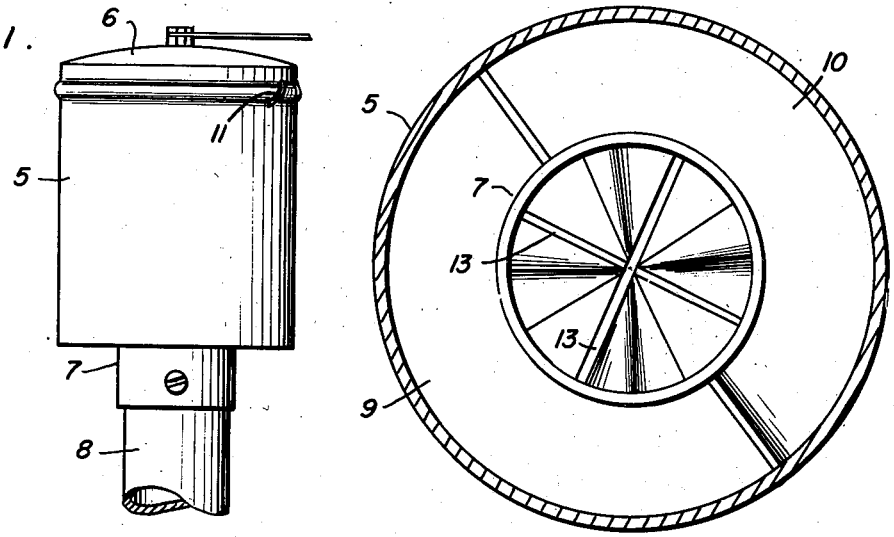
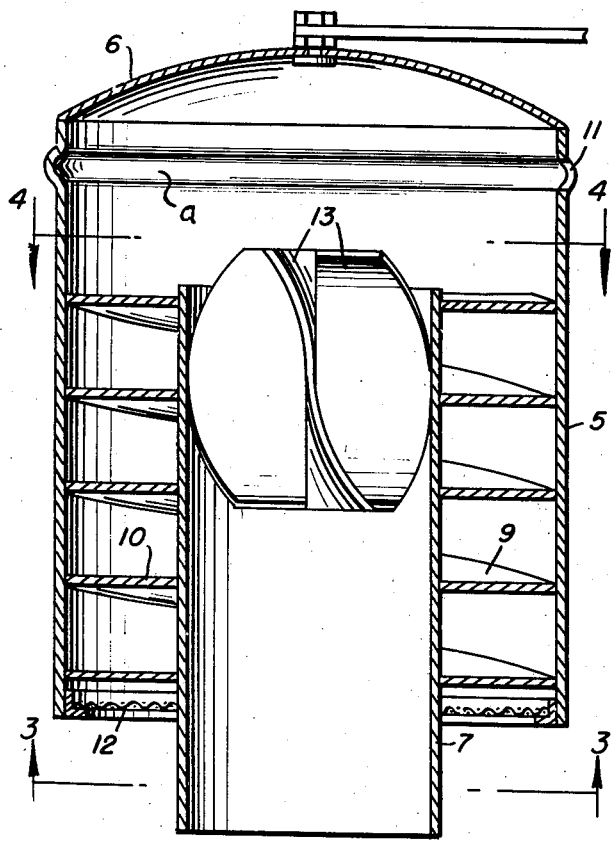
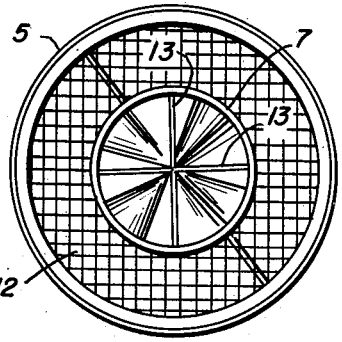
Feb. 8, 1949.     E. PSIKAL     2,461,395
AIR CLEANER
Filed Dec. 15, 1947
Fig. 1.
Fig. 2.
Fig. 3.
Fig. 4.
Emil Psikal
INVENTOR.

2,461,395

UNITED STATES PATENT OFFICE 2,461,395

AIR CLEANER

Emil Psikal, Dorchester, Nebr.

Application December 15, 1947, Serial No. 791,828

2 Claims. (Cl. 183—91)

This invention relates to improvements in air cleaners primarily adapted for use in connection with the air inlet of a carburetor employed in connection with an internal combustion engine, although capable of other analogous uses.

The primary object of the present invention is to provide an air cleaner of the above kind which is comparatively simple and durable in construction and highly efficient in operation.

A more specific object of the invention is to provide an air cleaner of the above kind in which the air is given a whirling motion for throwing dirt entrained in the air from the latter by centrifugal force.

Still another object of the invention is to provide means to continue the whirling motion of the air after being cleaned and in its passage to the carburetor or the like so as to enhance the fuel and air mixing function of the carburetor.

The exact nature of the present invention, as well as more specific objects and features thereof, will become apparent from the following description when considered in connection with the accompanying drawing, in which:

Figure 1 is an elevational view of an air cleaner constructed in accordance with the present invention;

Figure 2 is an enlarged central vertical sectional view thereof;

Figure 3 is a horizontal section taken on line 3—3 of Figure 2 and drawn on a smaller scale;

Figure 4 is a horizontal section taken on line 4—4 of Figure 2.

Referring in detail to the drawing, the present air cleaner comprises an upright cylindrical casing 5 which is closed at the top as at 6 and open at the bottom. An open ended outlet tube 7 has its upper major portion disposed centrally of and within the lower major portion of the casing 5, and the lower end of said outlet tube 7 projects below the casing 5 to fit over the air inlet of an engine carburetor or the like, indicated at 8.

A pair of uniformly spaced intertwined spiral baffles 9 and 10 rigidly connect the casing and the outlet tube and extend substantially from the lower end of the casing to the upper end of said outlet tube. The casing 5 has an internal annular channel a in the cylindrical wall thereof above the upper end of the outlet tube 7, and a small dirt escape opening 11 is provided through the wall of this channel a, a screen 12 extends across the space between the lower end of the casing and the outlet tube to remove large particles of dirt from air entering the bottom of the casing. The baffles 9 and 10 are adapted to cause whirling of air within the upper portion of the casing 5 after passing upwardly between said casing and the outlet tube 7, so that smaller particles of dirt entrained in the air will be thrown by centrifugal force outwardly into the channel a and will ultimately pass out through the dirt escape opening 11.

Spiral twisted vanes 13 are fixed within the upper end portion of the outlet tube 7 to continue the whirling of the clean air passing through said tube from the top of the casing to the carburetor air inlet or the like, thereby enhancing the mixing of air and fuel as performed by the carburetor to which the cleaned air is supplied. Any suitable means may be provided for firmly mounting the air cleaner in place, as is generally known in the art.

From the foregoing description, it is believed that the construction, arrangement and advantages of the present air cleaner will be readily understood and appreciated by those skilled in the art. When the tube 7 is fitted over the air intake 8, the engine suction draws air into the casing 5 through the open space covered by the screen 12. In passing to the upper portion of the casing, the air is given a whirling action by the baffles 9 and 10 so that small particles of dirt entrained in the air will be thrown out of the opening 11 by centrifugal force. It will of course be understood that larger particles of dirt are prevented from entering the casing by the screen 12. The cleaned air then passes downwardly through the tube 7 to the carburetor, the whirling motion of the air being continued by the spiral twisted vanes 13. Minor changes in details of construction are contemplated, such as fairly fall within the spirit and scope of the invention as claimed.

Having thus described the invention, what is claimed as new is:

1. An air cleaner comprising an upright cylindrical casing completely closed at the top and open at the bottom, an open ended outlet tube having its upper major portion disposed centrally of and within the lower major portion of said casing, the lower end of said outlet tube projecting below the casing to fit over the air inlet of a carburetor or the like, a pair of uniformly spaced intertwined spiral baffles rigidly connecting the casing and the outlet tube and extending substantially from the lower end of the casing to the upper end of the outlet tube, said casing having an internal annular channel in the cylindrical wall thereof above the upper end of the outlet tube and being provided with a dirt escape opening through the wall of said channel, and a screen extending across the space between the lower end of the casing and the outlet tube to remove large particles of dirt from air entering the bottom of the casing, said baffles being adapted to cause whirling of air within the upper portion of the casing so that smaller particles of dirt entrained in such air will be thrown outwardly into said channel by centrifugal force and will be rotated in said channel to ultimately pass from the casing through said dirt escape opening.

2. The construction defined in claim 1, in combination with twisted spiral vanes fixed within the upper end portion of said outlet tube to continue the whirling of the clean air passing into said tube from the top of the casing.

EMIL PSIKAL.

REFERENCES CITED

The following references are of record in the file of this patent:

UNITED STATES PATENTS

| Number | Name | Date |
|---|---|---|
| 1,501,144 | Stone | July 15, 1924 |
| 1,795,888 | Rabezzana | Mar. 10, 1931 |
| 1,934,311 | Kegerreis et al. | Nov. 7, 1933 |
| 2,134,978 | Marshall | Nov. 1, 1938 |
| 2,232,913 | Heuberger | Feb. 25, 1941 |